United States Patent [19]

Bickford

[11] 3,980,945
[45] Sept. 14, 1976

[54] DIGITAL COMMUNICATIONS SYSTEM WITH IMMUNITY TO FREQUENCY SELECTIVE FADING

[75] Inventor: William J. Bickford, Weston, Mass.

[73] Assignee: Raytheon Company, Lexington, Mass.

[22] Filed: Oct. 7, 1974

[21] Appl. No.: 512,654

[52] U.S. Cl. .................................. 325/30; 325/65
[51] Int. Cl.² ..................... H04B 3/04; H04L 27/10
[58] Field of Search ................ 325/42, 56, 65, 161, 325/164, 30; 343/100 CS, 5 L, 5 C, 5 R; 178/66, 67

[56] References Cited
UNITED STATES PATENTS

| | | | |
|---|---|---|---|
| 3,478,268 | 11/1969 | Coviello | 325/65 |
| 3,665,472 | 5/1972 | Kartchner et al. | 325/65 |
| 3,714,573 | 1/1973 | Grossman | 325/32 |
| 3,794,921 | 2/1974 | Unkauf | 325/42 |

Primary Examiner—Benedict V. Safourek
Attorney, Agent, or Firm—John R. Inge; Joseph D. Pannone; Milton D. Bartlett

[57] ABSTRACT

A digital communications system with increased resistance to frequency selective fading. Digital signals to be transmitted are phase shift modulated upon a spectrum spreaded carrier. The carrier is generated by mixing the output of a band spread oscillator with a locally generated IF oscillator signal. The signal thus obtained is divided into transmission periods, each of which is longer than the maximum spreading time of the nonlinear transmission medium. The increased bandwidth occupancy thus obtained increases the immunity of the transmitted signals to frequency selective fades moving across the allocated bandwidth. The signals are received by a differentially adaptive receiver which automatically adjusts its response to the envelope of received signals.

11 Claims, 6 Drawing Figures

DIGITAL COMMUNICATIONS SYSTEM WITH IMMUNITY TO FREQUENCY SELECTIVE FADING

BACKGROUND OF THE INVENTION

1. Field of the Invention

The invention relates to a digital communications system in which data is to be transmitted over a frequency or time dispersive medium in which fading of the transmitted signal is caused by multipath or other type of nonlinear distortion.

2. Description of the Prior Art

Digital communications systems wherein transmission is made through a frequency or time dispersive medium have used many different modulation types. Various systems have employed pulse duration modulation, frequency shift keying and phase shift keying including quarternary phase shift keying as well as numerous other schemes. In each of these systems, a modulator has operated directly upon a locally generated sine wave carrier signal. The bandwidth of the transmitted signal in previous systems was dependent therefore only upon the spectral spreading caused by the modulation of the sine wave carrier signal. Unfortunately, the bandwidth of a frequency selected fade moving in frequency through a transmission band was frequently equal or greater than the bandwidth of the transmitted signal. When the fade was in time alignment with the transmitted signal, the signal would be completely obliterated before it could reach the receiver.

The systems of the prior art show several methods for attempting to overcome the frequency selective fading problem. Many systems employed a plurality of receiving antennas spaced apart from one another so that the signal received by at least one of the antennas would not be affected by the selected fade. As the frequency selective fade could obliterate the entire signal over a relatively large region of, such systems could not entirely solve the problem. Hence, the only truly effective remedy was to substantially lengthen the transmission time for each bit of digital data to increase the probability that the fade would not be present during the entire bit transmission time. This, of course, reduced the maximum bit transmission rate for the entire digital communications system. Moreover, the average transmitter power was also reduced in many systems as the power available for each pulse transmission was spread out over a longer time interval.

Moreover, in many of the systems of the prior art, efficient use was not made of the entire bandwidth allocated for each digital transmission channel. As the bandwidth was dependent only upon the modulation present, it was common that only a small portion of the entire bandwidth was used at any one transmission interval.

SUMMARY OF THE INVENTION

Accordingly, it is an object of the present invention to provide a digital communications system with substantial immunity to frequency selective fades.

Also, it is an object of the present invention to provide a digital communications system which makes effective use of the allocated bandwidth per channel.

Moreover, it is an object of the present invention to make the most effective use of available transmitter power for predetermined frequency fade characteristics.

These as well as other objects of the present invention are met by a digital communications system wherein the transmitter IF oscillator signal is band spread modulated before impression of the desired digital data modulation. The IF oscillator signal is multiplied by the band spread oscillator signal in a mixer circuit. The carrier signal thus generated is gated off and on by a keying pulse circuit at a rate dependent upon the transmission characteristics of the medium. The gated carrier is phase shift modulated by the input digital data stream and transmitted.

Numerous types of band spread oscillators may be used depending upon the frequency response desired, the allocated bandwidth and the allowable circuit complexity.

The signals are received with a differentially adaptive receiver which automatically adapts to the received waveforms. The receiver stores previous samples of distorted received pulses for use as a reference in a coherent matched filter type detector employing decision feedback to allow coherent detection without channelizing filters.

DESCRIPTION OF THE PREFERRED EMBODIMENT

Figure 1:
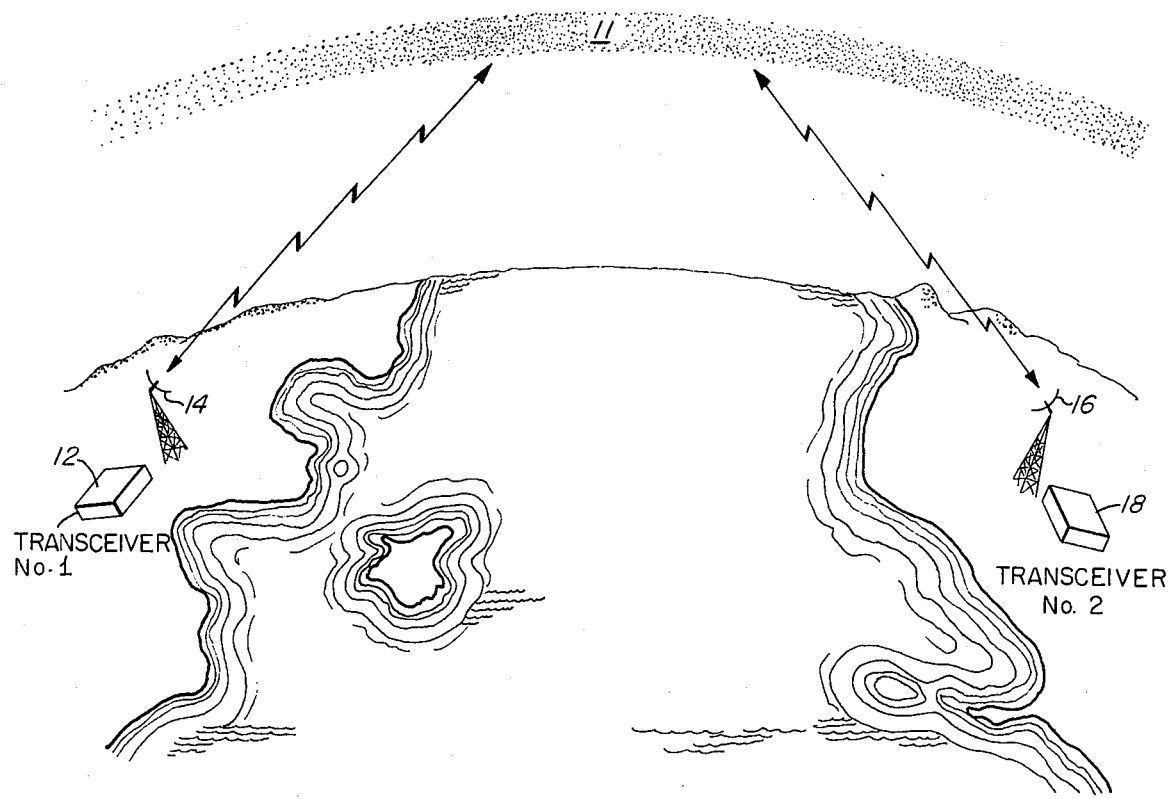
FIG. 1 is a perspective view of a bi-directional troposcatter digital communcations system in which the present invention is used to advantage.

FIG. 1 shows a troposcatter communications system in which the present invention is of particular use. Such communications systems rely upon reflections from layers in the troposphere 11 to achieve communications between distant points located beyond the horizon from one another. The reflective layers within the troposphere 11 are by no means uniform. There may be several partially reflective layers, one on top of the other, each frequently shifting in location as well as degree of reflectivity. The plurality of different reflective layers in the troposphere causes the multiple reflected signals to be additive at some positions and frequencies while subtracting and cancelling one another at other positions and frequencies. The movement of the various reflective layers in time causes the fading of received signals at any one location to vary as a function of the frequency of the signals. If the spectrum of a fade condition coincides in frequency with the spectrum of the signal or is greater in bandwidth and encompasses the spectrum of the signal, the entire signal will be cancelled and no information will reach the receiving station.

With the use of the present invention, transceiver no. 1 12 transmits through antenna 14 a digitally quarternary phase shift keyed signal with a bandwidth occupying the greater part of the allocated bandwidth per channel. The transmitted signals are reflected from the various reflective surfaces within troposphere 11 and received by antenna 16 and transceiver no. 2 18. The two transceivers may be located a substantial distance from one another, such as over the horizon. Distances of several hundred miles are typical for applications of this type. Transmission may be accomplished in the reverse direction from transceiver no. 2 18 to transceiver no. 1 12. Each transceiver embodies receiving and transmitting circuitry in accordance with the present invention.

Figure 2:
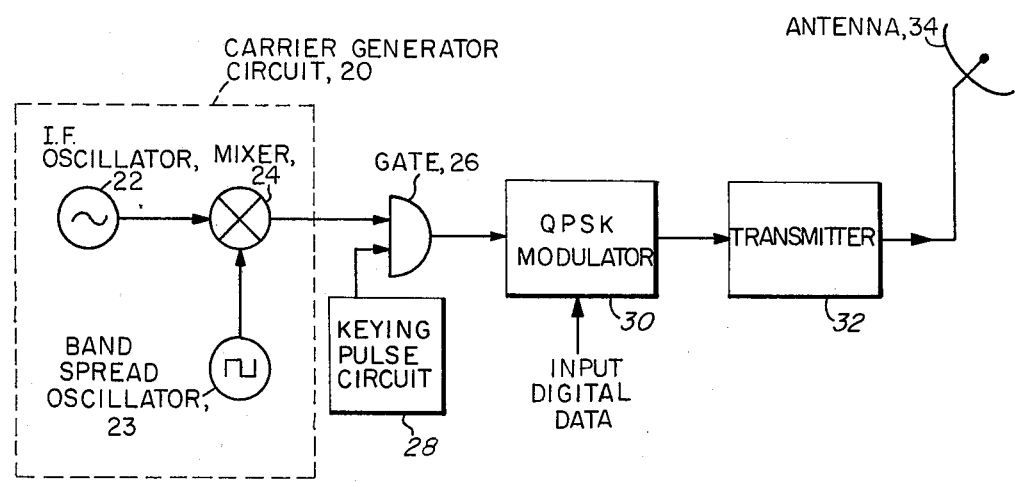
FIG. 2 is a block schematic diagram of a carrier generator circuit and modulator in accordance with the present invention.

FIG. 2 is a block schematic diagram of a carrier generator circuit, modulator and transmitter constructed in accordance with the teachings of the present invention. In carrier generator circuit 20 an IF oscillator 22 produces a sine wave signal at the desired IF frequency. Most commonly, and in the preferred embodiment, a frequency of 70 MHz is employed. Band spread oscillator 23 produces a second signal at a substantially lower frequency than that of IF oscillator 22. In the preferred embodiment, the output of band spread oscillator 30 is a square wave having a frequency of 1.25 MHz. The signals generated by IF oscillator 22 and band spread oscillator 30 are multiplied one against the other by mixer 24. The carrier signal so generated appears on the output of mixer 24.

The carrier signal is gated on and off through gate 26 by keying pulse circuit 28. The resulting bursts of the carrier signal are quarternary phase shift keyed modulated by the input digital data stream by QPSK modulator 30 at the rate of two bits for each keyed pulse. Transmitter 32 amplifies the digitally modulated burst of carrier signals heterodyning them with an internal oscillator transmitting them upon a frequency suitable for troposcatter operation. A frequency between 300 MHz and 10 GHz is preferred.

Figure 4:
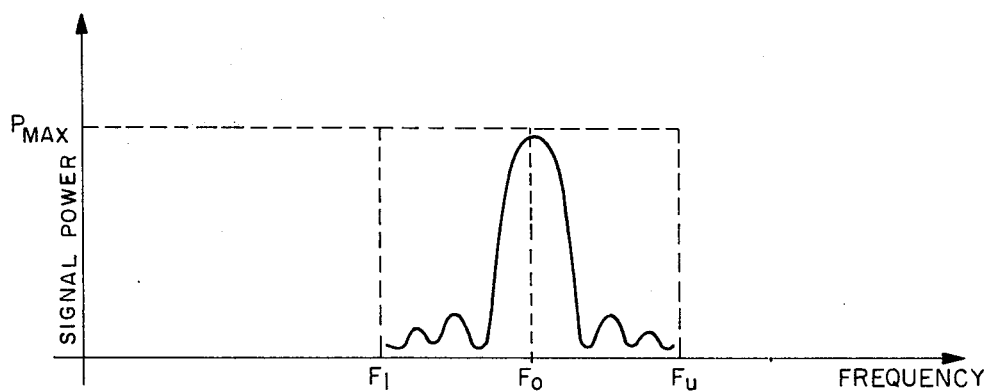
FIG. 4 is a diagram of the frequency spectrum and band occupancy of a communications system before the present invention is utilized.

Prior art systems were operated with only a single sine wave oscillator for production of the subcarrier signal. The spectrum of such a signal after gating by a keying pulse circuit appears in FIG. 4 and is the familiar (sin $x$)/$x$ spectrum for a single frequency output from the keying pulse circuit. $F_l$ and $F_u$ are respectively the lower and upper bounds of the allocated bandwidth for the particular transmission channel. $P_{max}$ is the maximum peak power permitted for this system operation. As is well known, the half power points of the center peak of the spectrum centered around $F_O$ is dependent upon the length of time the carrier is gated on. The longer the carrier is gated on, the narrower the spread between half power points of the spectrum. As the width of the spectrum is increased, the time required for transmission of each data bit is increased and hence the rate of transmission of data is decreased. Also, filling the allocated bandwidth with a single peak does not minimize the effects of a frequency selective fade. If the width of the spectrum shown in FIG. 4 is increased by using a shortened keying pulse, the average transmitted power is correspondingly reduced and accordingly the reliability of the system is also reduced.

Figure 5:
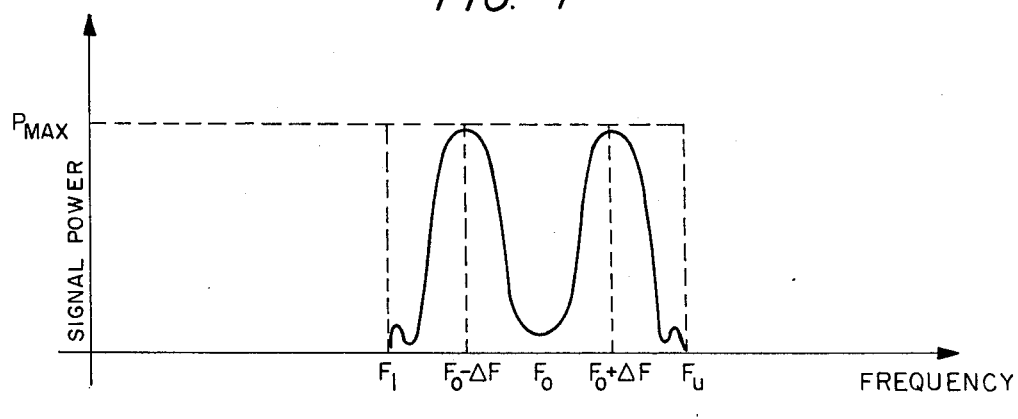
FIG. 5 is a diagram of the frequency spectrum and band occupancy of the same system after application of the present invention.

FIG. 5 illustrates the spectrum obtained with the use of the present invention. In the spectrum shown in FIG. 5, the time during which the carrier is gated on is identical with that of the spectrum shown in FIG. 4. However, as is quite evident from the drawing, the spectral occupancy with the use of the present invention is much greater than has previously been accomplished. Moreover, the increased utilization of the allocated bandwidth is accomplished without decreasing the average transmitter power. There are two major carrier peaks present, one on each side of center frequency $F_o$, the frequency of IF oscillator 22 of FIG. 2. Each major peak is displaced from $F_O$ by $\Delta F$, the primary frequency of band spread oscillator 23 of FIG. 2. There are other frequency components in the frequency spectrum of the circuit shown in FIG. 2 caused by the harmonics contained in the square wave band spreading signal.

Figure 3:
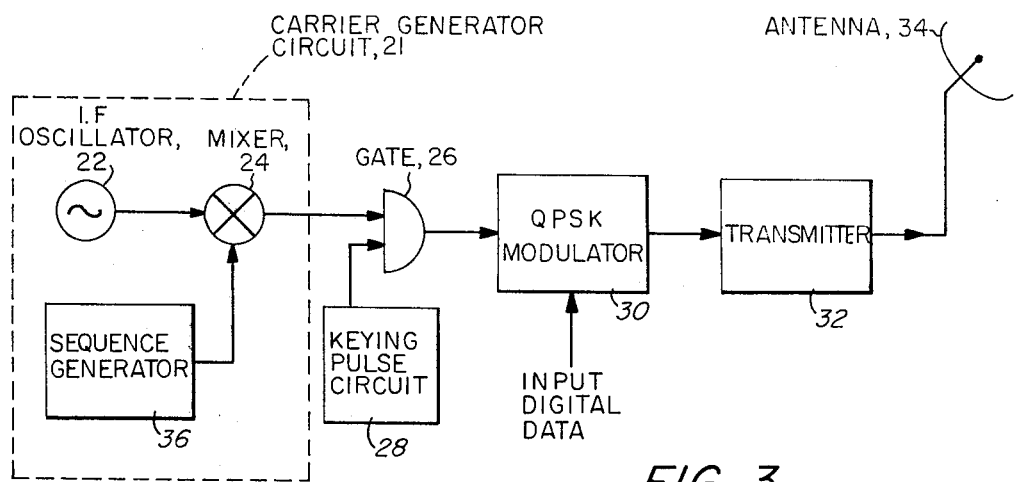
FIG. 3 is a block schematic diagram showing an alternative embodiment of the system of FIG. 2.

In FIG. 3 is shown an alternative embodiment of the carrier generator circuit and transmitting circuitry as shown in FIG. 2. In the alternative carrier generator circuit 21, the band spread oscillator 23 of FIG. 2 has been replaced by sequence generator 36. Sequence generator 36 produces as its output a predetermined sequence of binary numbers. The binary bits or numbers in the sequence are chosen to give a desired output spectrum depending upon the application requirements. For example, a Barker code or pseudo-Barker code sequence is particularly useful in reducing sidebands of the main spectral peaks. In the preferred embodiment, sequence generator 36 comprises a read-only memory in which the predetermined sequence is stored. The read-only memory is preferably addressed by a continuously cycling binary counter.

Signals may be received at both transceivers by the differentially adaptive receiver described in U.S. Pat. No. 3,794,921 of Manfred G. Unkauf and assigned to the present assignee, the specification of which is herein incorporated by reference. As described therein, the receiver automatically adapts to the spectral response of the received signals for any type of transmitted wave form and nonlinear frequency selective distortion.

Figure 6:
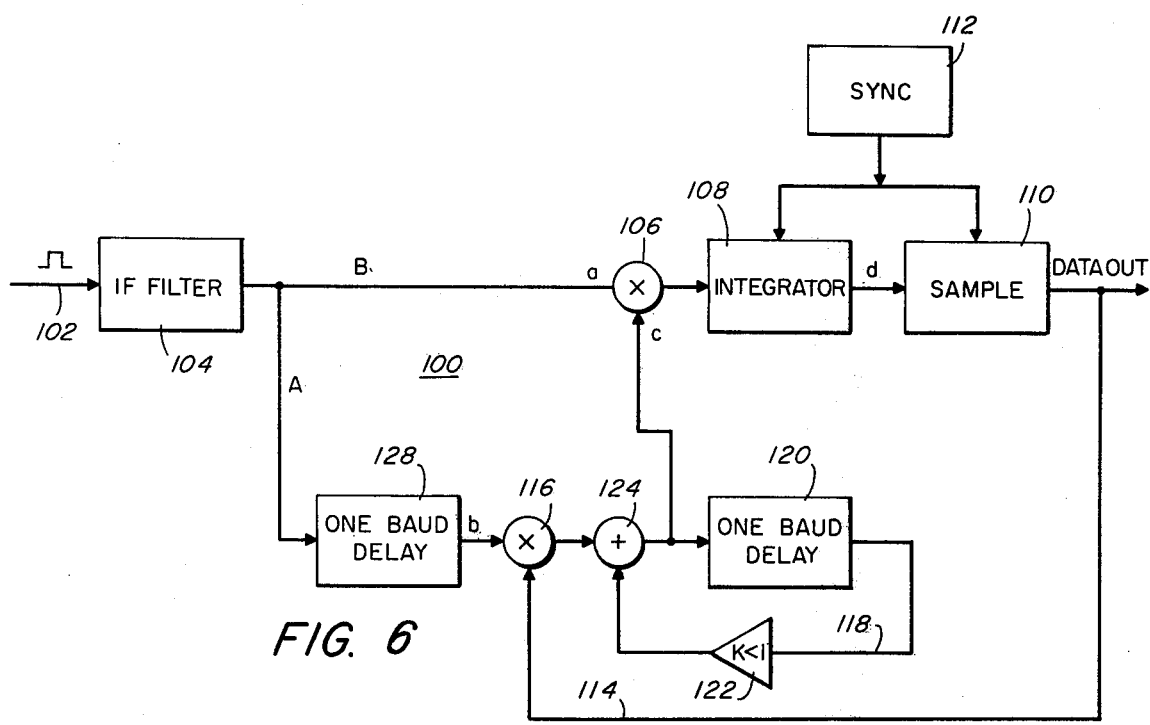
FIG. 6 is a block schematic diagram of a differentially adaptive receiver as used with the invention.

Referring now to FIG. 6, there is disclosed generally at 100 a differentially adaptive receiver in accordance with the present invention which may be used for receiving binary phase shift keyed transmission in a totally digital system. Phase coded pulses or phase shift modulation on a carrier is received from digital sources such as telephone data modems, microwave communications, radar, etc. over distorted, time variant or dispersive channels such as channel 102 which pulses are spread out in time due to multipath distortion with little resemblance to the pulse or waveform as originally transmitted. However, since such digital channels are linear or near linear, successive transmitted pulses will produce the same basic pulse response as long as the coherence time of the channel is much greater than the individual pulse durations. Thus the received pulses will bear a relative phase relationship to the transmitted pulses and the repetition period of pulses transmitted via channel 102 may be chosen such that the multipath contribution from one pulse will not overlap those of another pulse. While phase shift keyed pulses are described in the present embodiment, it is to be understood that other basic pulse types such as pulse compression, frequency shift keying and the like may be employed as the differentially adaptive receiver essentially provides the correct complex pulse envelope for whatever pulse is transmitted and received as will be described.

A received pulse is fed to a conventional intermediate frequency filter 104 as in any standard receiver. The output of the intermediate frequency filter 104 is coupled via path A to a delay of one band for the generation of a reference pulse as will be explained and by path B to a mixer 106 where the generated reference pulse is compared with the received output from intermediate filter 104. The product of the received pulse and the generated reference pulse is integrated over a suitable period and by integrator 108 and a bit decision is made by sampler 110 as will be explained with synchronization being provided by a conventional sync circuit 112 to both the integrator 108 and the sampling circuit 110. This operation is similar to that of a matched filter receiver provided that the reference pulse has the same phase and complex envelope as the received pulse. The output of sample 110 is fed back via feedback loop 114 to an inverse modulator 116 wherein the digital phase modulation is removed from the distorted received pulse leaving only the pulse envelope. The decision feedback, which is determined by the actual data bits sampled by sampling circuit 110 is used as the reference. This reference has the same complex envelope as the incoming digits and provides a coherent reference which would be provided by the ideal matched filter if such were the case. In contradistinction, the standard phase shift keying receiver provides only a reference which does not change with changing channel conditions, whereas by providing the same complex envelope as the incoming signal, the provided reference follows the distortion of the incoming pulse, that is, it automatically adapts to channel induced distortion over a broad band. By delaying the incoming signal from the IF filter 104 by one baud in the delay 128 or the number of bits before pulse repetition occurs, suitable time is provided such that coincidence occurs between the signal upon which a bit decision must be made and the incoming signal since the integration and sampling operation also requires one baud for completion.

The reference signal is stabilized against occasional decision errors by a recirculation path 118 by which the inverse modulation output of modulator 116 is delayed by one baud in a conventional delay 120, is recirculated around the feedback path 118 through an operational amplifier 122 with a gain of less than 1 in accordance with well-known principles to a summer 124, the output of which in actuality is the stabilized reference. This positive feedback stabilization network additionally attenuates noise which may be present in the generated reference by recirculating the data bits such that they add in phase and thus provide an ideal coherent matched filter without the noise generally associated with either coherent matched filters or sampling circuits in general.

As previously described, the reference is obtained by storing previous pulses in a recirculating storage loop after their phase is corrected by decision feedback from sampler 110. If the decision feedback is essentially error free, as it would be for most error rates of interest, the signal amplitude of the feedback loop builds as the series $$1 + K + K^2 + \ldots = 1/(1 - K)$$

while the noise power builds as $$1 + K^2 + K^4 + \ldots = 1/(1 - K^2)$$

The resultant signal-to-noise ratio improvement in the reference loop is then $$(1 + K)/(1 - K)$$

greater than that of the received signal. A practical value of $K = 0.9$ yields a 13 db improvement in signal-to-noise ratio resulting in a nearly noiseless reference. This, of course, is ideal for use as a modem and the error performance of such a modem is $$P_e = Q\sqrt{2\rho}$$

where $P_e$ is the bit error probability and $$\rho = \frac{\frac{E}{N_o}(1 - K^2)}{\frac{T_o N_o W}{E}(1 - K)^3 + 2(1 - K)}$$

where $E$ is the energy per baud, $N_o$ is the input noise density, $W$ is the receiver rectangular noise bandwidth and $K$ is the gain of the recirculating storage loop. For values of $T_o W > 1$ and $K < 1$, error rate performance within a few tenths of a decibel of that of ideal coherent phase shift keying with matched filter detection may be easily obtained.

Although preferred embodiments of the invention have been described, numerous modifications and alterations thereto would be apparent to one skilled in the art without departing from the spirit and scope of the present invention.

What is claimed is:
1. A digital communications system with improved immunity to frequency selective fading in a communications channel comprising in combination:
   a first oscillator for producing an intermediate frequency substantially sine wave shaped signal;
   a second oscillator for producing a square wave band spreading signal of lower frequency than said sine wave signal;
   means for multiplying said sine wave shaped signal by said square wave signal, a carrier signal being produced as an output of said multiplying means;
   means for gating said carrier signal on and off at a predetermined rate;
   means for phase shift modulating the gated carrier signal;
   a differentially adaptive receiver, said receiver comprising means for deriving a reference signal having substantially the same complex envelope as the envelope of received signals; and
   means for producing digital output signals from said received signals comprising means for comparing said received signals with said reference signal.
2. The combination of claim 1 wherein said phase shift modulating means comprises quarternary phase shift keying means.
3. The combination of claim 2 further comprising means for heterodyning and transmitting the phase shift modulated gated carrier signal upon a second carrier signal having a frequency in the range of 300 MHz to 10 GHz.
4. The combination of claim 3 wherein transmitted signals are reflected from the troposphere.
5. A transceiver for a tropospheric digital communications system comprising in combination:
   a transmitter comprising:
   an oscillator for producing an intermediate frequency substantially sine waved shaped signal;
   means for producing a signal representing a predetermined sequence of binary numbers;

a mixer circuit for modulating said substantially sine wave signal with said signal representing said predetermined sequence of binary numbers, said mixer producing a carrier signal as an output;

means for gating said carrier signal on and off at a predetermined rate; and means for phase shift modulating the gated carrier signal with a quarternary phase shift code in response to an input stream of digital data; and a receiver comprising:

means for receiving signals of the type transmitted by said transmitting means, said receiving means comprising means for deriving a reference signal having substantially the same complex envelope as said received signals, said receiving means deriving said reference signal independent of the sequence of binary numbers used in producing said transmitted signals; and means for producing digital output signals from said received signals comprising means for comparing said received signals with said reference signal.

6. The combination of claim 5 wherein said sequence producing means comprises in combination:

a memory for storing the binary numbers in said sequence;

means for sequentially addressing said memory.

7. The combination of claim 5 wherein said sequence producing means comprises in combination:

a shift register; and means for presetting said shift register with said sequence of binary numbers.

8. The combination of claim 5 further comprising means for transmitting the gated modulated signals over a tropospheric propagation path.

9. A method of communicating digital data over a tropospheric progagation path comprising the steps of:

producing an intermediate carrier signal at a first frequency;

producing a band spreading signal, said band spreading signal comprising a predetermined sequence of binary numbers;

mixing said intermediate carrier signal with said band spreading signal to produce a carrier signal;

gating said carrier signal on and off at a predetermined rate;

quarternary phase shift modulating the gated carrier signal with an input stream of digital data to produce a modulated carrier signal;

transmitting said modulated carrier signal upon a second carrier signal in the range of 300 MHz to 10 GHz and over a tropospheric propagation path;

receiving transmitted signals with a differentially adaptive receiver, said receiver being self-adaptive to the spectrum of received signals, said receiver deriving a reference signal having the same complex envelope as said received signals, said receiver deriving said reference signal without a replica of said band spreading signal; and said receiver producing digital output signals from said received signals by comparing said received signals with said reference signal.

10. The method of claim 9 wherein said predetermined sequence of binary numbers comprises alternating ones and zeros.

11. The method of claim 9 wherein said sequence of binary numbers comprises a Barker code.

* * * * *